UNITED STATES PATENT OFFICE.

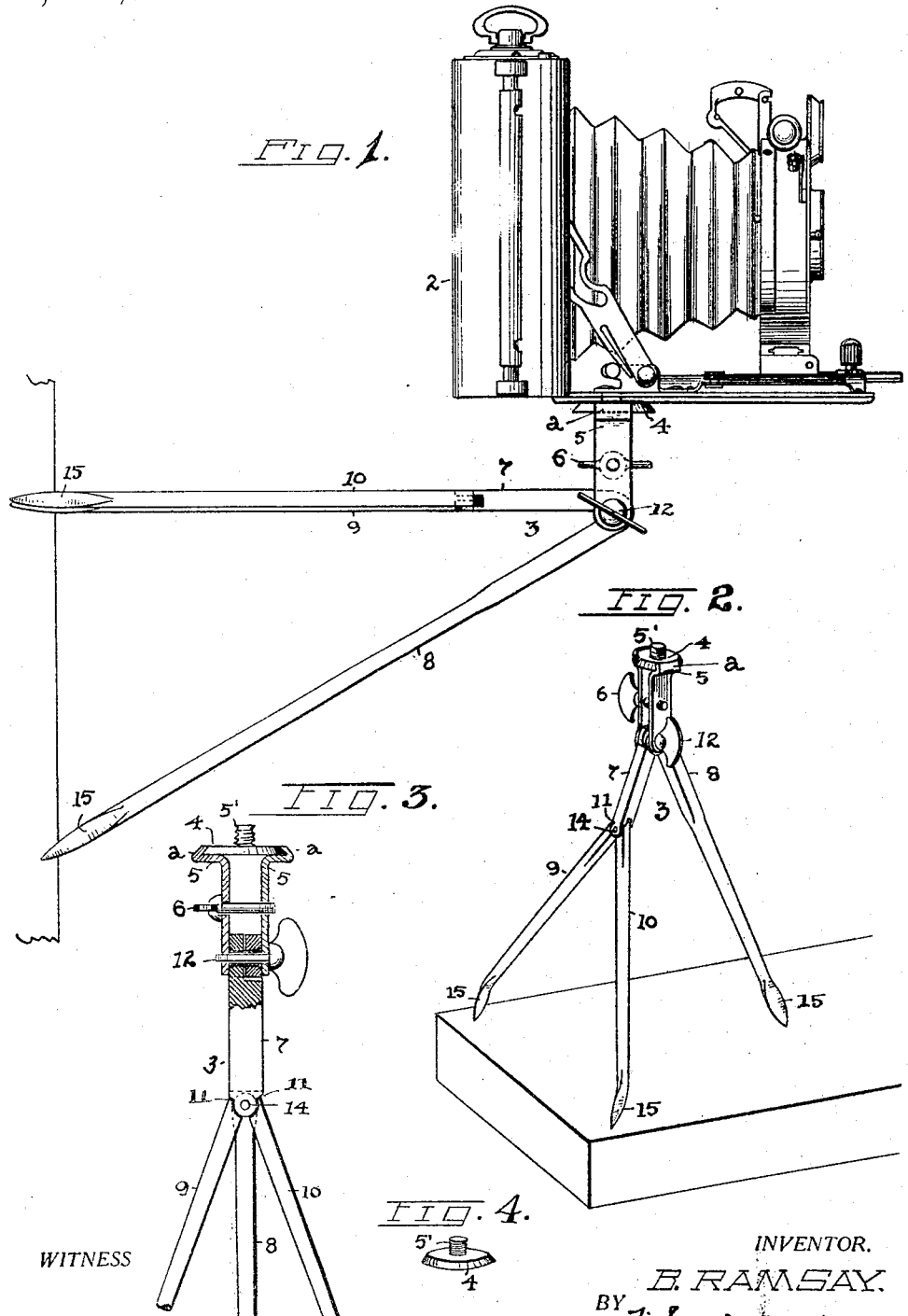

BURT RAMSAY, OF CLEVELAND, OHIO.

CAMERA-SUPPORT.

1,198,766.  Specification of Letters Patent.  Patented Sept. 19, 1916.

Application filed July 1, 1915. Serial No. 37,623.

*To all whom it may concern:*

Be it known that I, BURT RAMSAY, a citizen of the United States, residing at Cleveland, in the county of Cuyahoga and State of Ohio, have invented certain new and useful Improvements in Camera-Supports, of which the following is a specification.

My invention relates to an improvement in folding supports for cameras, and the object of the invention is to provide a support of relatively small size adapted to be folded and carried within the camera case or in a vest or coat pocket.

To these ends, the device comprises a divided clamping head and a swivel attachment for the camera, and swiveled legs with knife-blade points to provide convenient and firm attachment of the support upon a tree, post, or other stationary support.

In the accompanying drawing, Figure 1 is a side view of a camera and my improved folding support (full size) on an upright support; and Fig. 2 is a perspective view of the support resting on a horizontal base and apart from the camera. Fig. 3 is an elevation of the support partially sectioned in its head portion and somewhat enlarged as compared with Figs. 1 and 2. Fig. 4 is a perspective view of the swivel disk.

The camera 2 shown in the drawings is of the folding so-called vest pocket size or type, and the support shown is of a corresponding size but distinct and separate therefrom as an article. However, when the camera is equipped with the swivel disk or member 4 as shown herein, and which may be made a practically permanent part of the camera, the said support may be said to be a necessary part of the camera. All cameras of standard make have screw holes or sockets in their bottom adapted to receive the screw stem *s* of said disk, and said disk 4 is beveled at its circumferential edge to effect locking engagement therewith by the jaws *a* on the two clamping members 5 referred to herein as the head of the support. The said members or clamps are adapted to grip said disk firmly between them, and to this end are connected by a clamping screw 6 which can be tightened or loosened at pleasure as the use of the device may require. If said clamping members be loosened slightly they can be bodily removed from the disk 4 and said disk can also be removed when desired.

In a sense the support 3 is a tri-pod but with the difference and originality in this instance over tri-pods generally that only two leg members 7 and 8 connect with the body 5, while the member or stub 7 is provided with two equal legs 9 and 10. The said leg stub 7 and the longer single leg 8 are pivoted together upon the clamping screw 12 which connects the lower or outer ends of the head clamps 5, while the legs 9 and 10 are adapted to open or spread within limits and to fold on the pivot 14 in the end of stub 7. Practically, and as the said support is used in connection with uprights, such as posts, trees or other objects, the leg 8 really becomes the main support or brace for the camera, as seen in Fig. 1 while the leg extensions 9 and 10 serve chiefly as anchors. All said three members have pointed extremities 15 and are flattened and of knife blade formation so that they can be easily forced into a wooden object by hand and withdrawn without marring or injuring the object. Furthermore, and to make anchorage in the said parts 9 and 10 effective the extremities thereof are bent or curved inward somewhat toward each other which provides accommodation for setting one of said legs first and then the other with more or less spread between them and with increased friction and security by reason of such curvature. The camera is thus provided with a stable and fixed support having exceptional adaptation to upright objects but equally well calculated to rest upon an inclined or horizontal base, as in Fig. 2, and the device will retain its adjusted position wherever placed. When folded the legs come close together and occupy very little space in a pocket, but the parts can be quickly separated for more permanent packing when desired. A camera operator is thus provided with the most convenient and simple medium conceivable for field work and he is not encumbered, as heretofore, with heavy and bulky paraphernalia to obtain time exposures, such as the usually large tripods used for this purpose. It will be especially observed that with this device the camera can be turned or tilted in any direction and fixed therein by the clamping screws. Uniform spreading of the legs 9 and 10 is fixed by the shouldered joints 11 and the operation of erecting and leveling the support is greatly facilitated by reason of this form of construction. It is also essential to have leg 8 longer than the stub and its diverging extensions to obtain good bracing relations between all the legs.

Any wooden article, such as a post, board, tree, etc., is quickly and easily penetrated by a direct thrust where a flat knife blade extremity 15 is used, and a flat thin blade does not greatly mar the wood, and a further and decided advantage of a flat blade is that it prevents a throwing movement of the support after the blade is thrust into place.

What I claim is:

1. A camera support comprising a disk having a screw stem, a divided clamping head to hold said disk, a clamping screw through said head, legs pivotally mounted on said head and one of said legs having two extensions mounted on its end and adapted to fold and said leg extensions having knife blade extremities.

2. The construction described comprising a disk with a beveled edge and a screw at its center, a head having clamping jaws engaging said disk and two leg members clamped on said head, one of said members having two leg extremities foldably mounted thereon and provided with knife blade extremities.

3. The construction described comprising an attachment of disk shape having a screw at its center and a beveled edge, a head consisting of two clamping members having jaws engaged on said disk and a clamping screw substantially through the middle of said clamping members and supporting legs clamped in the extremity of said head.

4. A camera support comprising two leg members pivotally connected and of different lengths, and the shorter leg member having diverging extremities, in combination with means surmounting said leg members to support a camera in swiveled relations therewith.

5. A camera support comprising a clamping head and a pair of legs pivotally connected therewith, and a pair of diverging extensions having a shouldered hinge connection with one of said legs.

6. A camera support comprising a swivel member, a clamping head, and a pair of folding legs, one of said legs having a pair of folding extensions provided with knife-blade extremities.

7. A camera support comprising a swivel member having a screw stem, a sectional clamping head for said member, a clamping screw for said head, a short and a long leg foldably mounted upon said head, and a pair of foldable extensions for one of said legs.

8. A camera support comprising a disk having a screw stem, a divided head to hold said disk, a clamping screw for said head, folding legs having a clamping screw to fasten the same to said head, one of said legs having diverging extremities.

9. A camera support having two folding legs, one of said legs having diverging extremities and the other leg being of greater length than the said leg and its extremities.

10. In a pocket camera support, a substantially disk-shaped swivel member having a beveled edge and a central stem thereon adapted to support a camera, in combination with a two-part clamping head engaging the edge of said member and legs pivoted on said head.

11. A camera support comprising a disk having a central screw stem rigid therewith, a sectional clamping head supporting said disk and folding legs attached to the extremities of said head.

12. A camera support comprising a head and legs pivotally clamped thereon, one of said legs having pivoted diverging branches with pointed extremities.

13. A camera support comprising a swivel disk having a central projection at its top, a head clamped on the edge of said disk, a pair of legs adjustably clamped on said head and one of said legs having a pair of pointed extensions pivoted in diverging relations thereon.

In testimony whereof I affix my signature in presence of two witnesses.

BURT RAMSAY.

Witnesses:
R. B. MOSER,
GEO. E. KRICKER

Copies of this patent may be obtained for five cents each, by addressing the "Commissioner of Patents, Washington, D. C."